United States Patent Office 2,978,323
Patented Apr. 4, 1961

2,978,323
ALLOYED FLOCKS FROM METAL CARBONYLS AND HALIDES

Arnold Schmeckenbecher, Roselle Park, N.J., assignor to General Aniline & Film Corporation, New York, N.Y., a corporation of Delaware No Drawing. Filed Dec. 17, 1956, Ser. No. 628,542

9 Claims. (Cl. 75—211)

The present invention relates to improvements in the production of sintered bodies of 90–93% porosity.

It is known that in the preparation of nickel or iron powders by thermal decomposition of metal carbonyl vapors, the ratio between the number of nuclei of the metal formed in unit time and the supply of metal to the nuclei for building up the powder particles may be varied. The number of nuclei formed can be increased by increasing the rate of heat transfer to the carbonyl vapors or by increasing the rate of carbonyl vapor passed into the decomposition zone. It is also possible to pass preformed nuclei into the decomposition zone together with the carbonyl vapors. The supply of metal to the nuclei can be decreased by diluting the carbonyl vapors with inert gases.

It has been proposed that non-volatile solid nuclei for the decomposition of iron or nickel carbonyl be formed by the instantaneous reaction of a very small amount of a halogen such as chlorine, bromine or iodine, with the metal carbonyl flowing to the hot free space of the decomposer or within it. In order to obtain a uniform distribution of pre-formed nuclei in the decomposition space, it is essential that the nuclei be formed and added to the carbonyl vapors before the carbonyl vapors are decomposed. This gives the nuclei time to be distributed more evenly in the carbonyl vapor. A uniform distribution of the nuclei is critical if too high a concentration at certain spots and formation of flocks is to be prevented.

Each of the above proposals yields a powder of small particles. If the ratio of formation of nuclei to the supply of material is further increased, a cotton wool like material ("flocks") is formed consisting of loose aggregates of knotty strands. The strands usually have a diameter below one micron.

Nickel or iron powder having a structure resembling that of cotton wool can be produced by the decomposition of carbonyl vapor in the free space of a heated vessel. To reduce the shrinkage on sintering of the powder, it has been proposed to dilute the carbonyl vapor in the free space of the decomposer with carbon monoxide and a very small amount of oxygen so as to promote the formation of solid nuclei for the powder.

Flocks formed by the foregoing proposals yield, on sintering at elevated temperatures in a hydrogen atmosphere, porous bodies with a porosity of about 75–86%. By porosity as employed herein is meant: the relation of voids to the total volume of the sintered body. The use of a diluent (carbon monoxide) results in a lower yield of material in a given time and, therefore, is not desirable.

I have discovered that a material which on sintering yields bodies of very high porosity can be obtained by adding a volatile halide, such as arsenic trichloride or phosphorus trichloride etc., to iron or nickel carbonyl vapors before or during decomposition in the free space of a heated decomposer without the use of carbon monoxide as a diluent. After sintering in hydrogen at 600–800° C. the porosity of the sinter cake ranges from 90 to 93%.

In practicing the present invention, a liquid halide, such as arsenic trichloride, phosphorus trichloride or tribromide, boron trichloride or tribromide, carbon tetrachloride, silicon tetrachloride, titanium tetrachloride, titanium tetrabromide, etc., is dropped in small amounts, i.e. from 0.5 to 10 ml. per 30 lbs. of carbonyl vapor, from the upper end of a decomposing chamber prior to or during decomposition of nickel or iron carbonyl in a customary decomposing vessel at a temperature of 250–300° C. A vessel of this type, including operating temperatures, is disclosed in United States Patent 1,759,659 and in British Patents 741,943 and 741,978. The liquid halide in the free space of the decomposition zone either decomposes or reacts with the metal carbonyl vapor or its decomposition products, resulting in flocks containing from 0.01% to 7.5% of arsenic, phosphorus, boron, silicon or titanium, etc., depending on the amount of liquid halide added.

The flocks are then sintered in hydrogen in the customary manner at 600–800° C. for a period of time ranging from 5 to 8 hours. The porosity of the sintered cake will vary between 90–93% depending upon the metal carbonyl and the volatile halide employed. When iron carbonyl is replaced by nickel carbonyl in the same reaction the sintered bodies have a porosity of 93%. When arsenic trichloride is replaced by phosphorus trichloride the porosity of the sintered iron carbonyl is 92% and in nickel carbonyl 91%. The porous bodies thus obtained are especially adaptable as electrodes in batteries. In view of their high porosity it becomes clearly manifest that electrodes from 93% porosity plates contain only 50% of the metal in an electrode from 86% porosity plates.

The following examples will illustrate the production of sintered bodies of 90–93% porosity.

*Example 1*

150 ml. of iron pentacarbonyl were heated to the boiling point (104° C.) in a steel flask of 200 ml. size. The vapors formed are passed through a steel pipe ½" wide (vapor line), which was heated to about 120° C., at a rate of about 80 ml. per minute. From the vapor line, the vapors were passed into the top of a 3" wide and 1 foot long vertically arranged steel pipe (decomposer), which was heated to 290° C., as measured by a thermocouple 1½" below the top and ½" apart from the wall of the pipe. Through a small hole in the vapor line just above the point where the vapor line is connected to the decomposer, the tip of a burette was introduced into the vapor line in such a way that drops of a liquid dispensed from the burette fall directly into the heated zone of the decomposer. Liquid arsenic trichloride was filled into the burette and one drop was added every 30 minutes.

The solid material formed was caught in a wide mouthed glass jar attached to the lower end of the decomposer.

The material contains 0.1% arsenic. Under the microscope it appears as a loose network of knotty branches of one micron diameter and below. The material was passed through an 80 mesh screen. The apparent density, as determined by a Scott flowmeter according to MPA (Metal Powder Association) standard 4–45T, was 0.28 g./cm.$^3$. The material (about 5 grams) was filled level into an Alundum boat 3½" long and heated in a slow stream (100 ml./min.) of hydrogen (in the 2" wide barrel of a conventional electric resistance furnace) at 800° C. for 6 hours. The density of the resulting sintered body was 0.47 g./cm.$^3$, the porosity was 94%.

By way of contrast, 150 cc. of iron pentacarbonyl were decomposed in the same apparatus under the same conditions as above but without addition of arsenic trichloride. The carbonyl vapor was diluted with about 20% by volume of carbon monoxide. The carbon monoxide was added to the carbonyl vapor in the vapor line.

The resulting material was screened and sintered as described. The density of the sintered body was 2.03 g./cm., the porosity was 74%.

Example II

A sample of nickel tetracarbonyl (150 ml.) was heated to its boiling point (43° C.) in a small steel flask of 200 ml. capacity. The vapors were passed through a vapor line, which was kept at about 60° C., from above into a vertical one foot long and 3" wide pipe (decomposer), heated to 250° C. This temperature was measured by a thermocouple 1½" below the top and ½" apart from the wall of the pipe. Through a small hole in the vapor line arsenic trichloride was dropped into the decomposer at a rate of about 1 ml. per 30 liters of carbonyl vapor, or approximately 1 drop every 30 minutes. The solid material formed was caught in a wide mouthed glass jar attached to the lower end of the decomposer.

The material contains about 0.1% arsenic. Under the microscope it appears as a loose network of knotty branches of one micron diameter and below. The material was passed through an 80 mesh screen. The apparent density, as determined by a Scott flowmeter according to MPA (Metal Powder Association) standard 4–45T, was 0.49. The material was filled level into an Alundum boat 4½" long and heated in a slow stream (100 ml./min.) of hydrogen (in the 2" wide barrel of a conventional electric resistance furnace) at 600° C. for 6 hours. The density of the resulting sintered body was 0.60 g./cm.$^3$, the porosity was 93%.

Example III

An experiment with nickel tetracarbonyl was carried out under the same conditions as Example II with the exception that the temperature in the decomposition vessel was kept at 290° C. instead of 250° C. and that phosphorus trichloride was used instead of arsenic trichloride.

The apparent density of material thus obtained was 0.50. The density of the sintered body was 0.83 g./cm.$^3$, the porosity was 91%.

Example IV

Example I was repeated with the exception that arsenic trichloride was replaced by an equivalent amount of boron trichloride with similar results.

Example V

Example I was repeated with the exception that arsenic trichloride was replaced by an equivalent amount of titanium tetrachloride with similar results.

Example VI

Example I was repeated with the exception that arsenic trichloride was replaced by an equivalent amount of silicon tetrachloride with similar results.

The sintered bodies prepared in accordance with the present invention are especially adaptable in the manufacture of plates for storage batteries. The iron arsenic flocks may be used in recorder tapes. A porous body with a porosity of 0.86 contains 14 volume percent of materials, while a porous body with a porosity of 93 contains 7 volume percent of material, i.e. only half the amount of metal (nickel or iron) is needed to make a battery plate of the same size. As the supply of nickel is short and the price high, it is advantageous to employ the sintered bodies prepared in accordance with the present invention.

The higher the porosity the more accessible is the inner surface of the porous body, making it better suited for catalysts and catalyst supports. The sintered body prepared from iron flocks can readily be covered by a nobler metal, such as nickel or copper, by immersing the porous body into an aqueous nickel, copper, etc. solution. A coating of the porous iron body with a catalyst metal by this or other methods, results in a catalyst which has the advantages of high porosity, especially in cases where only very little of the catalyst metal is needed.

The unusual feature of the present invention is that the porosity of the sintered bodies obtained from alloyed flocks is far greater than that obtainable from non-alloyed metal flocks.

Another unusual feature is that the intrinsic coercive force prepared from the flocks of this invention is substantially equivalent to the value obtained from carbonyl iron oxide. For example, the intrinsic coercive force of a cylindrical plug pressed from iron-arsenic flocks (0.1% arsenic) with a phenolformaldehyde resin binder was 150–190 oersted, as determined by a ballistic galvanometer. The corresponding value obtained, under the same conditions, with carbonyl iron oxide was 180 oersted. Flocks which do not contain arsenic, phosphorus, etc., yield an intrinsic coercive force of 90–110 oersted. In view of these characteristics the alloyed iron flocks are particularly adaptable as magnetic materials for recorder tapes. By "intrinsic coercive force" is meant the coercive force of a material, the particles of which are not aligned in a magnetic field.

While the present invention has been specifically described with respect to iron and nickel carbonyls, cobalt carbonyl and a mixture of cobalt with iron or nickel carbonyl can be treated in accordance with the present invention to yield electromagnetic bodies having new and valuable uses.

I claim:

1. The process of preparing sintered magnetizable bodies of 90–93% porosity which comprises treating a metal carbonyl in the free-space of a vessel heated to a temperature ranging from 250–300° C. with a liquid halide selected from the class consisting of chlorides and bromides of the elements of arsenic, boron, phosphorus silicon and titanium to yield flocks containing from 0.01% to 7.5% of the element from the said halide, and sintering the resulting flock.

2. The process of preparing sintered magnetizable bodies of 90–93% porosity which comprises treating iron carbonyl in the free-space of a vessel heated to a temperature ranging from 250–300° C. with a liquid halide selected from the class consisting of chlorides and bromides of the elements of arsenic, boron, phosphorus silicon and titanium to yield flocks containing from 0.01% to 7.5% of the element from the said halide, and sintering the resulting flock.

3. The process of preparing sintered magnetizable bodies of 90–93% porosity which comprises treating nickel carbonyl in the free-space of a vessel heated to a temperature ranging from 250–300° C. with a liquid halide selected from the class consisting of chlorides and bromides of the elements of arsenic, boron, phosphorus silicon and titanium to yield flocks containing from 0.01% to 7.5% of the element from the said halide, and sintering the resulting flock.

4. The process of preparing sintered magnetizable bodies of 90–93% porosity which comprises treating cobalt carbonyl in the free-space of a vessel heated to a temperature ranging from 250–300° C. with a liquid halide selected from the class consisting of chlorides and bromides of the elements of arsenic, boron, phosphorus silicon and titanium to yield flocks containing from 0.01% to 7.5% of the element from the said halide, and sintering the resulting flock.

5. The process according to claim 1 wherein the liquid halide is arsenic trichloride.

6. The process according to claim 1 wherein the liquid halide is phosphorus trichloride.

7. The process according to claim 1 wherein the liquid halide is boron trichloride.

8. The process according to claim 1 wherein the liquid halide is titanium trichloride.

9. The process according to claim 1 wherein the liquid halide is silicon tetrachloride.

References Cited in the file of this patent

UNITED STATES PATENTS

| | | |
|---|---|---|
| 2,198,042 | Schlecht | Apr. 23, 1940 |
| 2,612,443 | Goetzel et al. | Sept. 30, 1952 |
| 2,617,723 | Studders et al. | Nov. 11, 1952 |
| 2,768,427 | Frehn | Oct. 30, 1956 |
| 2,776,200 | Wallis | Jan. 1, 1957 |
| 2,818,633 | Hoyer | Jan. 7, 1958 |
| 2,844,456 | Llewelyn et al. | July 28, 1958 |
| 2,884,688 | Herz | May 5, 1959 |